US011479288B2

(12) United States Patent
Huber et al.

(10) Patent No.: US 11,479,288 B2
(45) Date of Patent: Oct. 25, 2022

(54) STEERING COLUMN FOR A MOTOR VEHICLE

(71) Applicants: thyssenkrupp Presta AG, Eschen (LI); thyssenkrupp AG, Essen (DE)

(72) Inventors: Sebastian Huber, Göfis (AT); Jean-Pierre Specht, Haag (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/967,873

(22) PCT Filed: Feb. 7, 2019

(86) PCT No.: PCT/EP2019/052984
§ 371 (c)(1),
(2) Date: Aug. 6, 2020

(87) PCT Pub. No.: WO2019/158424
PCT Pub. Date: Aug. 22, 2019

(65) Prior Publication Data
US 2021/0046970 A1 Feb. 18, 2021

(30) Foreign Application Priority Data
Feb. 13, 2018 (DE) ...................... 10 2018 202 157.0

(51) Int. Cl.
B62D 1/19 (2006.01)
B62D 1/181 (2006.01)

(52) U.S. Cl.
CPC ............... B62D 1/19 (2013.01); B62D 1/181 (2013.01)

(58) Field of Classification Search
None
See application file for complete search history.

(56) References Cited

U.S. PATENT DOCUMENTS 5,690,362 A * 11/1997 Peitsmeier ............. B62D 1/181
280/775
2006/0169524 A1* 8/2006 Born ........................ B62D 1/19
180/444

(Continued)

FOREIGN PATENT DOCUMENTS

DE      10 2007 036 466 A      6/2008
DE         102009033430 A1 *   1/2011 ........... B62D 5/0421

(Continued)

OTHER PUBLICATIONS

English Translation of International Search Report issued in PCT/EP2015/052984, dated May 9, 2019.

Primary Examiner — Faye M Fleming
(74) Attorney, Agent, or Firm — thyssenkrupp North America, LLC

(57) ABSTRACT

An adjustment drive for a motor-adjustable steering column for a motor vehicle, includes a spindle drive having a threaded spindle which engages in a spindle nut which, so as to be able to be driven in a rotating manner about the spindle axis relative to the threaded spindle, is coupled to the rotor shaft of a drive motor which has a rotor and a stator. In order to enable a compact design with minor complexity, the rotor shaft of the drive motor is configured as a hollow shaft which is disposed so as to be coaxial with the spindle axis and in which the threaded spindle is coaxially disposed.

12 Claims, 6 Drawing Sheets

(56) References Cited

U.S. PATENT DOCUMENTS

| | | | | |
|---|---|---|---|---|
| 2021/0129888 A1* | 5/2021 | Huber | ............... | B62D 1/181 |
| 2021/0139067 A1* | 5/2021 | Schacht | ............... | B62D 1/181 |
| 2021/0171085 A1* | 6/2021 | Huber | ............... | F16B 17/006 |
| 2021/0206419 A1* | 7/2021 | Specht | ............... | F16C 19/183 |

FOREIGN PATENT DOCUMENTS

| | | | | |
|---|---|---|---|---|
| DE | 10 2012 212 608 A1 | 2/2014 | | |
| DE | 102012212608 A1 * | 2/2014 | ............ | B62D 5/0427 |
| DE | 10 2012 221 596 A | 5/2014 | | |
| DE | 10 2017 207 561 A | 7/2017 | | |
| DE | 102017000354 A1 * | 7/2018 | ............ | B62D 1/184 |
| EP | 0 612 651 B | 11/1994 | | |
| EP | 1 600 665 A | 11/2005 | | |
| JP | H05-105087 A | 4/1993 | | |
| JP | 2007 008266 A | 1/2007 | | |
| WO | 2014/079611 A | 5/2014 | | |
| WO | 2018/202672 A | 11/2018 | | |

* cited by examiner

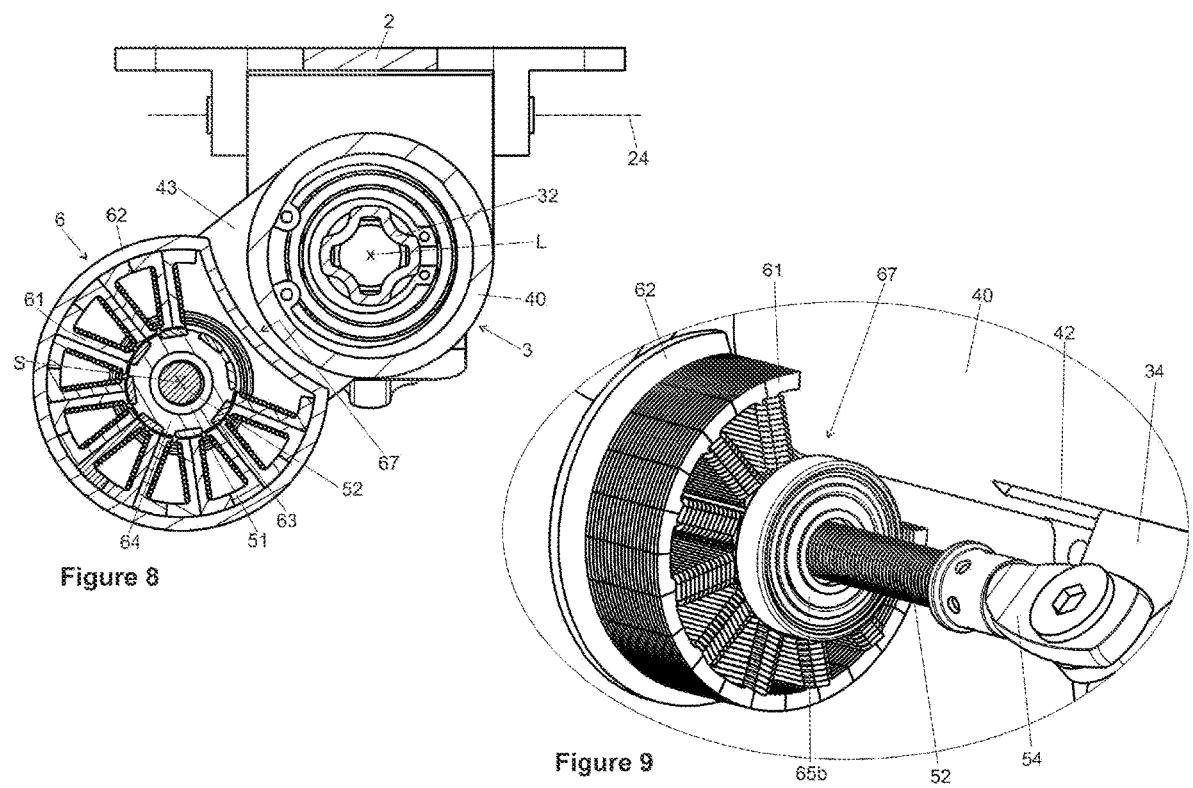

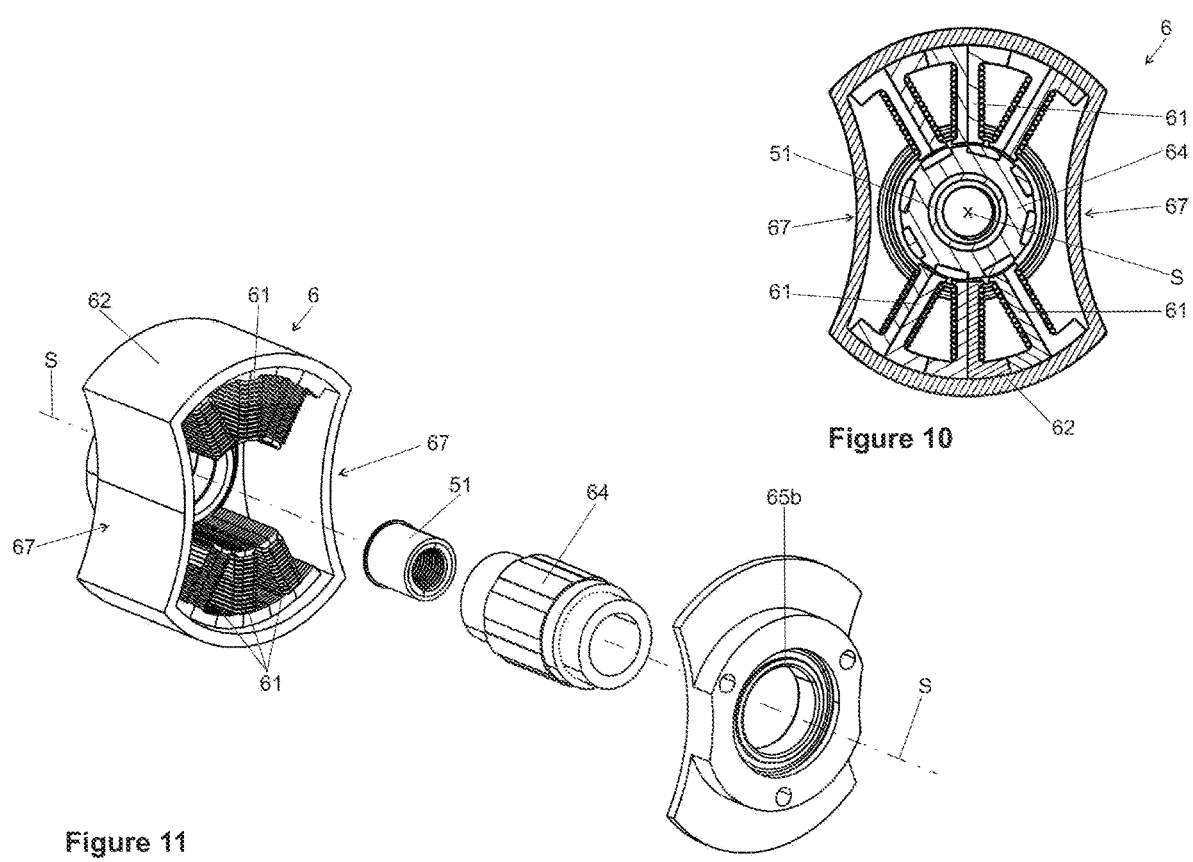

STEERING COLUMN FOR A MOTOR VEHICLE

CROSS REFERENCE TO RELATED APPLICATIONS

This application is a U.S. National Stage Entry of International Patent Application Serial Number PCT/EP2019/052984, filed Feb. 7, 2019, which claims priority to German Patent Application No. DE 10 2018 202 157.0, filed Feb. 13, 2018, the entire contents of both of which are incorporated herein by reference.

FIELD

The present disclosure generally relates to an adjustment drive for a motor-adjustable steering column for a motor vehicle.

BACKGROUND

Steering columns for motor vehicles have a steering shaft having a steering spindle, a steering wheel for introducing steering command by the driver of being attached to the end of said steering spindle that in the driving direction is the rear end and faces the driver. The steering spindle, so as to be rotatable about the longitudinal axis thereof, is mounted in a casing tube of an actuator unit which is held on the vehicle bodywork by a support unit. Longitudinal adjusting of the steering wheel relative to the bodywork can be performed on account of the actuator unit having at least one casing tube which in a casing unit connected to the support unit, also referred to as a guide box or a swingarm box, is telescopically displaceable in the direction of the longitudinal axis. Height adjustment can be implemented in that the actuator unit, or a casing unit receiving the latter, is mounted so as to be pivotable on the support unit. The adjustment of the actuator unit in the longitudinal or height direction, respectively, enables an ergonomically comfortable steering wheel position to be set relative to the position of the driver in the operating position, also referred to as the driving position or operating position, in which manual steering intervention can take place.

In motor-adjustable steering columns it is known for a motorized adjustment drive having a drive unit which comprises an electric drive motor which drives a spindle drive having a threaded spindle which is screwed into a spindle nut to be provided. The threaded spindle and the spindle nut are able to be driven in a rotating manner in relation to one another about the threaded spindle axis, or the spindle axis for short, by the drive unit, on account of which the threaded spindle and the spindle nut, depending on the rotating direction, can be moved in a translatory manner toward one another or away from one another in the direction of the threaded spindle axis. The threaded spindle and the spindle nut in the direction of the spindle axis are supported on parts of the steering column that can be adjusted relative to one another, for example on a casing unit and a support unit, or on casing tubes of a casing unit which are telescopic in the axial direction.

In an embodiment known as a plunger spindle drive the threaded spindle in terms of rotation about the spindle axis is coupled in a non-rotatable manner to a stationary part of the steering column, for example to the support unit, the casing unit, or a casing tube, and the spindle nut is able to be driven in a rotating manner but in the direction of the spindle axis supported on a part of the steering column which is adjustable relative to said stationary part. A translatory movement relative to the threaded spindle can be effected by the rotating drive of the spindle nut, on account of which the parts of the steering column that are connected by way of the spindle drive can be mutually adjusted. A steering column having an adjustment drive of this type is described in DE 10 2017 207 561 A1, for example.

In the drive unit of the known steering column, the rotor shaft of the drive motor which is coaxially connected to the rotor and is also referred to as the motor shaft, is coupled to the spindle nut by way of a gearbox. For example, the rotor shaft has a worm which engages in a worm wheel of a worm gear that is connected to the spindle nut. Known construction modes of this type of drive units are indeed reliable but necessitate a relatively high degree of complexity in terms of production and assembly. Moreover, the requirement in terms of installation space is high and if at all can be adapted to tight installation space conditions in the vehicle by way of high additional complexity. Thus, a need exists for a motorized adjustment drive which requires little complexity and can be easier to design in a compact manner, as well as a steering column in a compact construction mode.

BRIEF DESCRIPTION OF THE FIGURES

FIG. 8 is a cross-sectional view of section A-A through the steering column according to FIG. 7.

FIG. 9 is a schematic, partially sectional, perspective detailed view of the adjustment drive.

FIG. 10 is a cross-sectional view of a drive motor in a second embodiment, as in FIG. 8.

FIG. 11 is an exploded perspective view of the drive motor according to FIG. 10.

DETAILED DESCRIPTION

Figure 1:
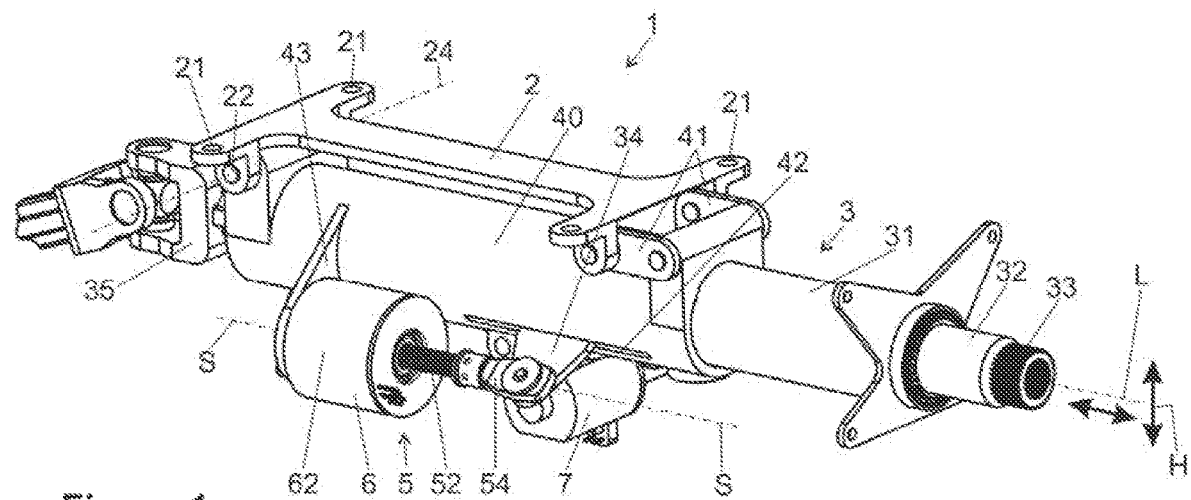
FIG. 1 is a schematic perspective view of a steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to an adjustment drive for a motor-adjustable steering column for a motor vehicle, comprising a spindle drive having a threaded spindle which engages in a spindle nut which, so as to be able to be driven in a rotating manner about the spindle axis relative to the threaded spindle, is coupled to the rotor shaft of a drive motor which has a rotor and stator. The invention furthermore relates to a motor-adjustable steering column for a motor vehicle, comprising an adjustment drive of the disclosed type, the spindle drive of said adjustment drive being disposed between a support unit that is able to be connected to the bodywork and a casing unit that rotatably receives a steering spindle, and/or between casing tubes of a casing unit that are mutually adjustable in a telescopic axial manner and mount the steering spindle.

It is proposed according to the invention for an adjustment drive having the features mentioned at the outset that the rotor shaft of the drive motor is configured as a hollow shaft which is disposed so as to be coaxial with the spindle axis and in which the threaded spindle is coaxially disposed.

According to the invention, the drive motor is configured as a hollow shaft motor, the motor shaft thereof being formed by the rotor shaft that is fixedly connected to the rotor so as to be coaxial with said rotor and being a substantially tubular hollow shaft. The hollow shaft has an axial passage opening which in the direction of the spindle axis is at least continuous across part of the axial length of the rotor. The spindle nut is coaxially connected to the hollow shaft such that the threaded opening is aligned with the passage opening, and the threaded spindle engaging therein at least in portions runs centrally through the rotor shaft. On account of the threaded spindle, depending on the adjusted position of the spindle drive, in the direction of the spindle axis at least partially plunging into the rotor shaft and there being enclosed by the rotor, which in turn is coaxially received within the stator so as to be able to be driven in a rotating manner, a particular compact construction of the spindle drive including the motorized drive unit can be implemented. In the prior art, this cannot be implemented, or be implemented only with high complexity, on account of the gearbox axes which are spaced apart in parallel or are mutually transverse.

The spindle nut can preferably be connected directly to the rotor shaft in a rotationally fixed manner, without any intervening additional gear members. On account of a direct drive of this type in which the spindle nut rotates at the rotating speed of the rotor, a simple construction with minor complexity in terms of production and assembly results on the one hand, and the required installation space, which is largely occupied by the stator of the drive motor that coaxially surrounds the threaded spindle, can advantageously be reduced, on the other hand.

The spindle nut can preferably be received in an axial passage opening of the hollow shaft. On account thereof, it is possible for the spindle nut with the spindle thread in the direction of the spindle axis to be positioned within the longitudinal extent within the rotor shaft of the rotor, this facilitating a compact construction mode.

In principle, it is conceivable for the spindle nut to be configured so as to be integral to the rotor shaft such that the spindle thread is formed directly in the internal circumference of the passage opening.

One advantageous refinement lies in that the spindle nut has a force-fitting and/or form-fitting and/or substance-to-substance connection to the hollow shaft. The connection between the spindle nut and the rotor shaft herein comprises a translatory or longitudinal connection which is required for exerting and transmitting the adjustment force from the threaded spindle by way of the spindle nut in the direction of the spindle axis, and a rotary or rotating connection which serves for transmitting the motor torque from the rotor shaft to the spindle nut. The translatory connection and the rotary connection in practice can be designed in a single connection having dissimilar retaining properties in the longitudinal direction and the rotating direction, so as to effect enhanced functional properties in the interaction between the spindle nut and the rotor shaft, as will yet be explained hereunder.

For example, it is possible for the spindle nut to be configured so as to be externally cylindrical and for the rotor shaft to be configured so as to be internally cylindrical having adapted dimensions such that the spindle nut can be pressed axially, that is to say in the direction of the spindle axis, in a force-fitting manner into the passage opening in the hollow shaft, this enabling economical production and a capability to be positioned freely in axial and rotational terms. A maximum slippage torque of the motor can be predefined on account of the design embodiment of the friction-fitting fixing, for example as an overload protection. Alternatively, the passage opening can have an eccentric or prismatic cross section for transmitting the rotation of the rotor in a form-fitting manner to the threaded spindle. Independently thereof, the translatory connection can be configured in a friction-fitting manner, that is to say, as a friction-fit or a force-fit, respectively, which is effective in the direction of the spindle axis, so as to limit the maximum adjustment force that can be exerted in the direction of the spindle axis. Alternatively or additionally, form-fitting elements which are effective in the axial direction can also be provided in the case of the translatory connection, for example for forming detents, stops, or the like that are effective in the direction of the spindle axis. Alternatively or additionally, substance-to substance connections such as adhesive bonding or welding can in each case be provided so as to achieve resilient or else rigid/non-releasable fixing.

The connection can be configured at least on a sub-portion of the external circumference of the spindle nut. To this end, mutually corresponding friction-fitting or form-fitting elements can be provided externally on the spindle nut and internally in the rotor shaft, said friction-fitting or form-fitting elements enabling the spindle nut to be completely accommodated and fixed within the rotor shaft, for example.

One advantageous embodiment provides that the connection is designed so as to be releasable by breaking when exceeding a predefined limit force which in the direction of the spindle axis acts axially on the spindle nut relative to the hollow shaft. The limit force defines a threshold value of the force that is transmitted from the threaded spindle to the spindle nut, the adjustment and retention function of the spindle drive being rendered ineffective and the threaded spindle and the spindle nut being able to move relative to the hollow shaft without any relative rotation in the axial direction (of the spindle axis) when said threshold value is exceeded, in other words the spindle drive can be collapsed independently of the prevailing drive torque of the drive motor. On account thereof, the spindle drive serves as a predetermined breaking installation in which the steering column in the event of a crash, for example in the event of a frontal collision of the motor vehicle, when a body impacts the steering wheel with a high kinetic energy such that the retention effect of the connection is overcome by exceeding the limit force on the steering spindle, enables the steering column to collapse in the longitudinal direction and optionally in the height direction relative to the bodywork. On account thereof, the steering wheel can deflect in the adjustment installation or adjustment installations, on account of which the risk of injury to the vehicle occupants can be reduced. The predetermined breaking characteristic can be predefined, for example, by a predetermined breaking element which is disposed between the spindle nut and the hollow shaft and which breaks in an axial relative movement which is not generated by the spindle drive, or by a force-fitting or friction-fitting connection which is released when a predefined limit force is exceeded. In one particular advantageous refinement, the predetermined breaking element can be configured as a shear pin which is preferably disposed in a radial recess of the spindle nut and in a recess of the hollow shaft which is radially aligned to the former.

One advantageous embodiment of the invention provides that an energy absorbing installation is configured between the spindle nut and the hollow shaft. The energy absorbing installation, also referred to as the crash installation, is operatively connected to the spindle nut and to the hollow shaft in such a manner that said energy absorbing installation in the event of a crash absorbs the kinetic energy introduced into an adjustment drive, that is to say converts said kinetic energy to heat and/or deformation work and attenuates the relative movement between the spindle nut and the hollow shaft. On account thereof, a body which impacts the components of the steering column that are coupled to one another by way of the adjustment installations is decelerated in a defined manner, the risk of injury being minimized and the level of safety being increased on account thereof.

According to the invention, controlled absorption of energy can be implemented in a particularly favorable manner in that the energy absorbing installation has a friction installation and/or a deformation installation which interact/interacts with the spindle nut and the hollow shaft. Specifically, a friction installation can be provided in that in the event of a crash the spindle nut, by way of the kinetic energy acting on said spindle nut in the passage cross section of the hollow shaft is moved along in the direction of the spindle axis, wherein energy on account of friction arising therein is absorbed on a contact face between the spindle nut and the internal wall of the passage opening, for example on the circumferential faces which in an interference fit of the spindle nut lie against one another in a force-fitting manner. The level of the acting friction force herein can be set by way of the contact force acting radially in the interference fit, and/or the design of the contact faces lying against one another, for example the roughness of said contact faces, and/or the material pairing of the spindle nut and the hollow shaft. It is possible herein for the friction force across the length of the potential path of movement of the spindle nut along which the spindle nut in the event of a crash is axially displaced from the threaded spindle in the hollow shaft, and which can be referred to as the energy absorbing path or the crash path, to be predefined so as to be variable in portions of the hollow shaft, for example so as to implement a progressively increasing friction force across the energy absorbing path of the spindle nut in the direction of the spindle axis in the hollow shaft, for example by way of a constriction of the open passage cross section of the hollow shaft, and/or by increasing the roughness. Measures of this type can cause an increase in terms of the effective friction force in a movement along the energy absorbing path.

Additionally or alternatively, deformation elements can be disposed or configured on the spindle nut, preferably on the external circumference of the latter, and/or on the hollow shaft, preferably on the internal circumference of the latter, so as to project inward in the energy absorbing path. For example, one deformation element or a plurality of deformation elements disposed internally in the hollow shaft can cause an energy-consuming plastic deformation of the spindle nut when the latter in the event of a crash in the direction of the spindle axis is forced past said deformation element/elements. Deformation elements can be implemented, for example, by a cross-sectional constriction and/or a cross-sectional variation of the passage opening, and/or by protrusions or the like which in a relative movement entrench themselves in the spindle nut, or are squeezed into the latter.

The deformation installation can have at least one deformation element which is disposed in the passage opening of the hollow shaft and by which the spindle nut in an axial movement relative to the hollow shaft is plastically deformable. The deformation element have a protrusion which continuously encircles the internal circumference or is configured in portions across said internal circumference and which in the event of a crash projects into the path of movement of the spindle nut. Alternatively or additionally, a deformation element on the hollow shaft can be designed so as to be deformable by the spindle nut.

It is advantageous in the invention that the energy absorbing installation can be readily implemented by a corresponding design embodiment of the spindle nut and the hollow shaft, for example by adapting the relative dimensions, which is easily manageable in production, and/or by a preferably integral concave or convex shaping of deformation elements. On account thereof, an additional function for absorbing energy can be integrated in the spindle drive with little complexity and without additional components. It is furthermore advantageous that the integration of the energy absorbing elements in the passage opening of the hollow shaft does not require any additional installation space, on account of which the targeted compact construction mode of the direct drive according to the invention can be optimized in a simple manner. Moreover, the energy absorbing elements in the hollow shaft are protected against potentially harmful external influences, the functional reliability being increased on account thereof.

It can be provided that the spindle nut is configured from a softer material than the hollow shaft. It can be achieved on account thereof that the spindle nut in the event of a crash is deformed in a controlled manner so as to represent a reproducible energy absorbing characteristic. Moreover, optimized material pairings can be used for the various functions, for example a spindle nut made from non-ferrous metal or a plastics material which can be screwed in a smooth-running and low-wear manner onto a threaded spindle preferably made from steel, said threaded spindle in turn being sufficiently stiff and flexurally rigid so as to transmit axial forces in the adjusting action and in the event of a crash. The hollow shaft can likewise be composed of steel such that a high level of stiffness and dimensional stability is guaranteed and a reliable and controlled deformation of the spindle nut, which is softer in comparison to said hollow shaft, can take place by way of energy absorbing elements which are formed on said hollow shaft.

In one advantageous refinement it can be provided that the spindle nut is configured from plastics material, wherein the spindle nut is directly incorporated in the hollow shaft by means of an injection-molding operation, that is to say is injected into the hollow shaft by an injection-molding method. The hollow shaft herein preferably has at least one radial recess or concavity in which the plastics material can invade during the injection-molding operation, thus configuring a predetermined breaking element which is configured so as to be integral to, and in one piece with, the spindle nut.

The drive motor can preferably have a motor housing in which the hollow shaft is mounted. The motor housing, also referred to as the stator housing, receives the stator and at least partially surrounds the latter. The motor housing can furthermore have one bearing, or preferably two bearings, for rotatably mounting the hollow shaft, said bearing/bearings potentially being configured as friction bearing/bearings or preferably as roller bearing/bearings. For the connection to a stationary component of the steering column, or a component of the steering column which is adjustable relative to the motor housing, such as a support unit, casing unit, casing tube or the like, the motor housing can have a fastening means, for example flange bores, retaining pins, or the like.

One advantageous refinement provides that the hollow shaft has at least two axially spaced-apart bearings, preferably roller bearings, preferably in the end regions of the hollow shaft. A so-called "X mounting" is particularly well suited for receiving the load moments arising. The hollow shaft herein is mounted in two angular-contact roller bearings, for example angular-contact ball bearings, which on both sides of the rotor are mounted so as to be axially mirror symmetrical. The bearing inner rings are connected to the hollow shaft while the bearing outer rings are assembled in the motor housing, for example. The extensions of imaginary connecting lines through the contact faces of the rolling members of the bearing inner rings and bearing outer rings of the two bearings herein intersect in the shape of an X on the spindle axis, in the region of the hollow shaft between the bearings.

Alternatively, it can be provided that the hollow shaft is mounted by way of a single bearing, preferably a four-point roller bearing, preferably in one of the end regions of the hollow shaft. A four-point bearing is a single-row radial angular-contact ball bearing, the races thereof being configured such that, apart from radial loads, axial loads can also be absorbed in both directions. It is an advantage of this embodiment that a four-point bearing in the axial direction requires significantly less space than double-row bearings.

The drive motor is preferably configured as a servomotor. A servomotor of this type in a small construction mode can deliver a sufficiently high drive torque for directly rotating the spindle nut for the adjustment of the steering column, is practically maintenance-free and reliable.

A motor-adjustable steering column for a motor vehicle according to the invention comprises an adjustment drive having one or a plurality of the features described above, the spindle drive of said adjustment drive being disposed between a support unit that is able to be connected to the bodywork and a casing unit that rotatably receives a steering spindle, and/or between casing tubes of a casing unit that are mutually adjustable in a telescopic axial manner and mount the steering spindle. An adjustment drive can be used for the longitudinal adjustment in the direction of the longitudinal axis of the steering spindle, and also for the height adjustment of the casing unit relative to the support unit. Thanks to the compact construction mode according to the invention of the adjustment drive according to the invention, a likewise compact construction mode of the steering column can be implemented with little complexity.

Figure 2:
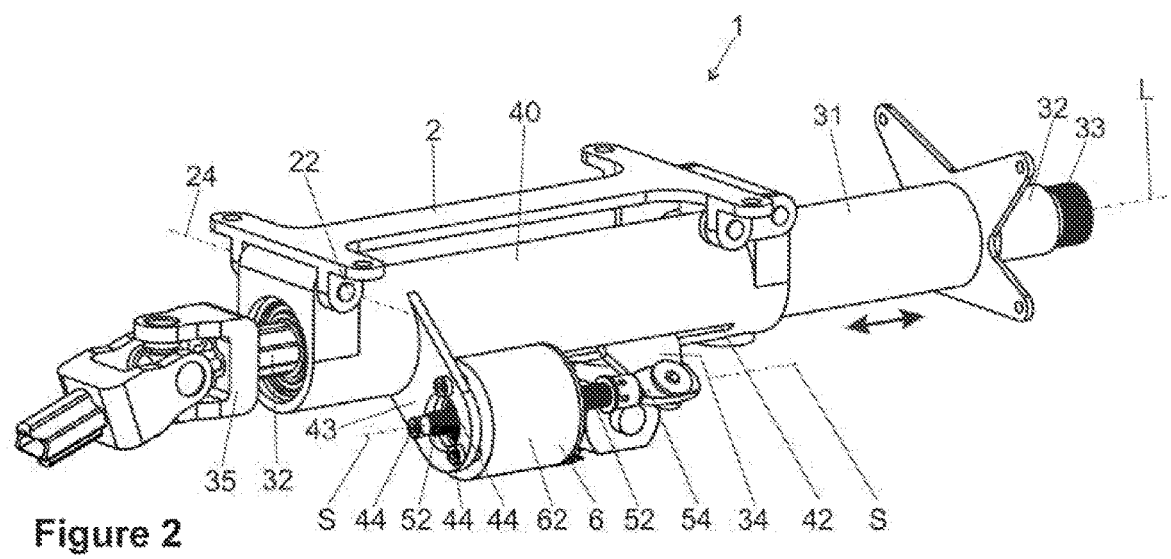
FIG. 2 is a further perspective view of the steering column, according to FIG. 1.
Figure 3:
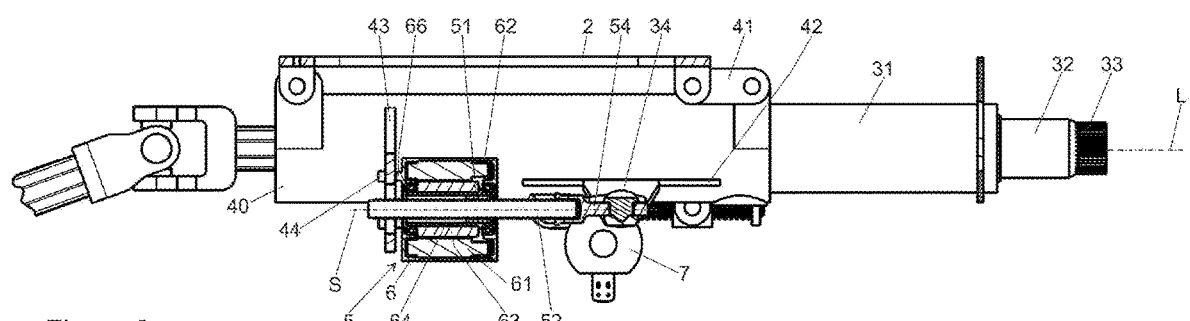
FIG. 3 is a longitudinal sectional view along the spindle axis of the adjustment drive of the steering column according to FIG. 1.

FIG. 1 shows a steering column 1 according to the invention in a schematic perspective view from obliquely above onto the rear end in terms of the travel direction of a vehicle (not illustrated), a steering wheel (not illustrated) here being held in the operating region. FIG. 2 shows a view onto the front end.

The steering column 1 comprises a support unit 2 which is configured as a console which has fastening means 21 in the form of fastening bores for attaching to a vehicle bodywork (not illustrated). A casing unit 4, also referred to as a guide box or a swingarm box, is held by the support unit 2, said casing unit 4 comprising an external casing 40, also referred to as the external casing tube 40, in which an actuator unit 3 having an internal casing 31, also referred to as an internal casing tube 31, is received.

A steering spindle 32 is mounted so as to be rotatable about the longitudinal axis L thereof in the casing tube 31, said steering spindle 32 extending axially in the longitudinal direction, that is to say in the direction of the longitudinal axis L. A fastening portion 33 to which a steering wheel (not illustrated) is able to be attached is configured at the rear end on the steering spindle 32. The steering spindle 32 at the front end is connected in a torque-fitting manner to a yoke 35 of a universal joint.

The internal casing tube 31 of the actuator unit 3 for implementing a longitudinal adjustment in the external casing tube 40 of the casing unit 4 is received so as to be telescopically displaceable in the direction of the longitudinal axis L, so as to be able to position the steering wheel connected to the steering spindle 32 back and forth in the longitudinal direction relative to the support unit 2, as is indicated by the double arrow parallel to the longitudinal axis L.

The casing unit 4 at the front end region thereof is mounted in a pivot bearing 22 on the support unit 2 so as to be pivotable about a horizontal pivot axis 24 which is transverse to the longitudinal axis L. The casing unit 4 in the rear region is connected to the support unit 2 by way of a rotatable actuator lever 41. On account of a rotating movement of the actuator lever 41, the casing unit 4 can be pivoted about the pivot axis 24 relative to the support unit 2, said pivot axis 24 in the installed state being horizontal, on account of which an adjustment of a steering wheel attached to the fastening portion 33 can be performed in the height direction H, this being indicated by the double arrow.

An adjustment drive 5 according to the invention for the longitudinal adjustment of the actuator unit 3 in the direction of the longitudinal axis L relative to the casing unit 4 has a spindle drive having a spindle nut 51 having an internal thread in which a threaded spindle 52 that extends along a spindle axis S engages, said threaded spindle 52 by way of the external thread thereof thus being screwed into the spindle nut 51. This arrangement can be readily seen in FIGS. 3 to 6. The spindle axis S runs so as to be substantially parallel to the longitudinal axis L.

The threaded spindle 52 by way of a fastening element 54 configured at the rear end of said threaded spindle 52 is connected to the internal casing tube 31 by way of a transmission element 34, and specifically so as to be fixed in the direction of the spindle axis S and also so as to be stationary in terms of a rotation about the spindle axis S. On account of the rotatingly drivable spindle nut 51 which in the direction of the spindle axis S is supported on the external casing tube 40, and the threaded spindle 52 which in terms of rotation is stationary relative to said spindle nut 51, a so-called plunger spindle drive is implemented.

The transmission element 34 from the actuator unit 3 extends through a slot-shaped passage opening 42 in the casing unit 4. In order for the steering column 1 to be adjusted in the longitudinal direction, the transmission element 34 can be freely moved along in the longitudinal direction in the passage opening 42.

The adjustment drive 5 has a drive unit having an electric drive motor 6, said drive unit being illustrated in detail in FIGS. 3 to 6. The drive motor 6 has a stator 61 which is disposed in a stator housing 62. A rotor 63 which has a rotor shaft 64 is mounted in roller bearings 65a, 65b in the stator 61 so as to be rotatable about the spindle axis S, said roller bearings 65a, 65b being inserted in the stator housing 62. The stator housing 62 in the direction of the spindle axis S is supported on the external casing tube 40.

Figure 4:
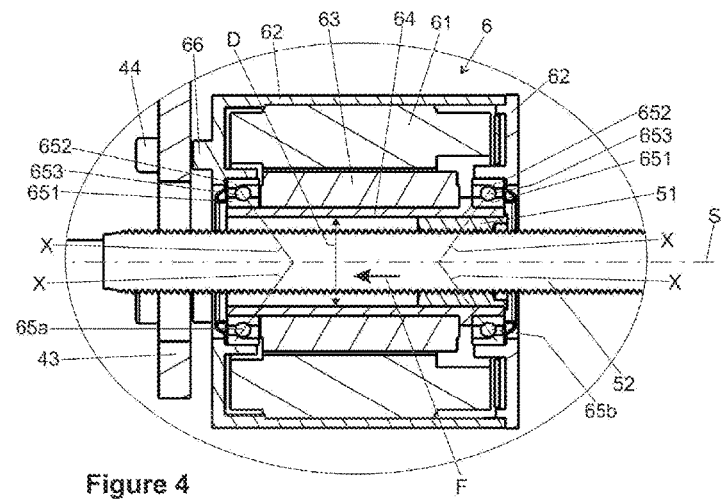
FIG. 4 is an enlarged sectional view through the drive unit of an adjustment drive from FIG. 3 in the normal operating position.
Figure 5:
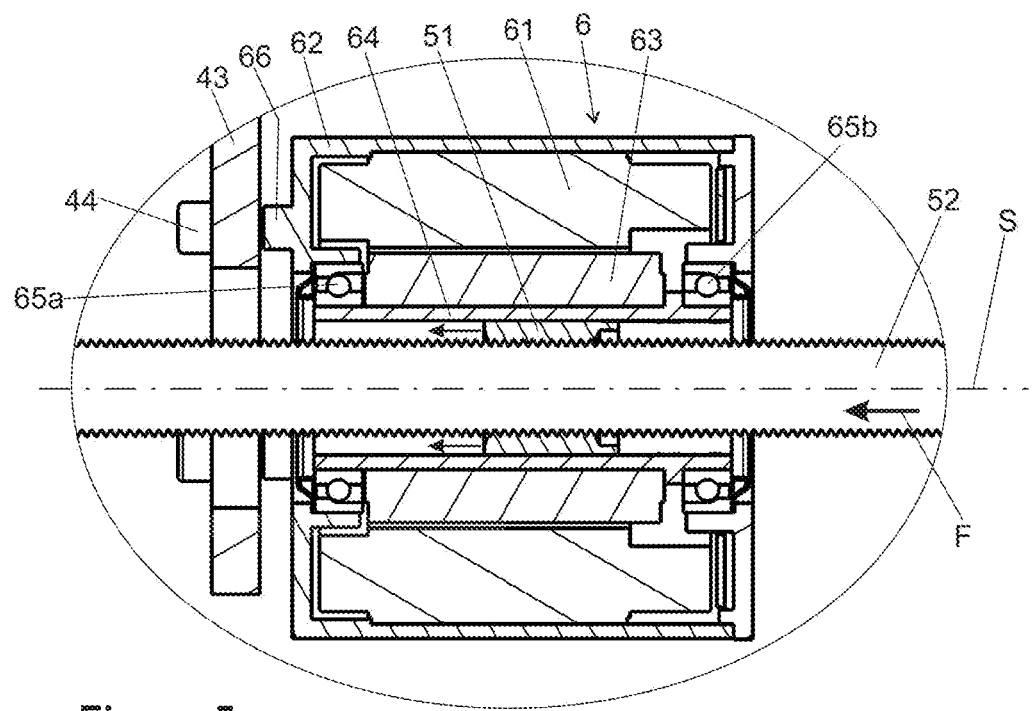
FIG. 5 is an enlarged sectional view of the adjustment drive from FIG. 3 after the event of a crash.

According to the invention, the rotor shaft 64 is configured as a tubular hollow shaft which has a passage opening which is continuous in the direction of the spindle axis S and which in the example illustrated in FIGS. 4 and 5 is circular having an internal diameter D.

The spindle nut 51 in the example illustrated is configured so as to be externally cylindrical and dimensioned such that said spindle nut 51, while forming an interference fit for generating the assembly illustrated in FIG. 4, can be pressed into the rotor shaft 64 in the axial direction. The interference fit generates a force-fitting or friction-fitting, respectively, connection between the internal face of the passage opening of the rotor shaft 64 and the external face of the spindle nut 51 that in the radial direction lies in a friction-fitting manner on said internal face. The spindle nut 51 in this embodiment illustrated is disposed in the rear end region of the passage opening that faces the driver.

In an embodiment not illustrated, the spindle nut in the direction of the spindle axis S is disposed so as to be centric in the rotor shaft.

The friction-fitting connection forms a rotary or rotating connection which serves for transmitting the motor torque from the rotor shaft 64 to the spindle nut 51 which is consequently driven directly at the rotating speed of the motor, on the one hand. On the other hand, said friction-fitting connection acts as a translatory or longitudinal connection by way of which the adjustment force from the threaded spindle 52 is transmitted by way of the spindle nut 51 in the direction of the spindle axis S.

The spindle nut 51 is coaxial with the spindle axis S and herein, as shown in the example, is preferably disposed completely within the rotor shaft 64.

The threaded spindle 52 which engages in the spindle nut 51 likewise extends so as to be coaxial with the spindle axis S, wherein said threaded spindle 52 in each potential state of adjustment at least partially plunges into the passage opening and is thus disposed within the rotor shaft 64.

The stator housing 62 has fastening means 66, for example a flange or pin-type protrusions, which are connected to a support console 43 which, for example by means of screws 44 or other fastening means, is fixedly attached to the external casing tube 40. On account thereof, the drive motor 6 is fixed to the casing tube 40 and supported in the direction of the spindle axis S.

For the longitudinal adjustment of the internal casing tube 31 of the steering column 1, the rotor 63 by a suitable electrical actuation can be driven in a rotating manner about the spindle axis S relative to the stator 61. On account thereof, the spindle nut 51 that is attached in a rotationally fixed manner in the rotor shaft 64 is directly driven in a rotating manner relative to the stationary threaded spindle 52 at the rotating speed of the rotor 63. Depending on the rotating direction of the drive 6, the threaded spindle 52 in the direction of the spindle axis S is repositioned in a translatory manner relative to the spindle nut 51 such that the internal casing tube 31 that is connected to the threaded spindle 52 in the direction of the longitudinal axis L is correspondingly adjusted in a telescopic manner relative to the casing tube 40 that supports the drive motor 6.

On account of the described disposal of the spindle nut 51 in the rotor shaft 64, an energy absorbing installation in a first embodiment is implemented in the embodiment shown in FIG. 4. In the event of a crash, for example in the event of a frontal collision, a high force F in the direction of the longitudinal axis L on account of a body impacting the steering wheel is introduced by way of the steering spindle 32 into the internal casing tube 31, and by way of the transmission element 34 is transmitted to the threaded spindle 52. This force F, also referred to as the crash force, in the direction of the spindle axis S is directed by way of the spindle nut 51 into the rotor shaft 64, and by way of the bearing 65a, b and the stator housing 62 on the support console 43 is finally absorbed on the external casing tube 40. Consequently, as is plotted in FIG. 4, the crash force F acts in the axial direction on the connection between the spindle nut 51 and the rotor shaft 64.

When the crash force F is so high that the limit force of the axial retention effect, this being the retention force of the friction-fit of the interference fit, is exceeded, the spindle nut 51 in the direction of the spindle axis S is displaced relative to the rotor shaft 64 on account of the crash force F herein acting from the right, as is indicated by the arrows in FIG. 5. The kinetic crash energy is absorbed on account of the friction arising in the relative movement between the external side of the spindle nut 51 and the rotor shaft 64.

The crash path, this being the path in the direction of the spindle axis S, along which kinetic energy can be dissipated by the relative movement between the spindle nut 51 and the rotor shaft 64 in the event of a crash, can extend across the length of the rotor shaft 64.

The embodiment of the rotor shaft 64 illustrated in FIG. 4 has an internal diameter D which is consistent across the length of said rotor shaft 64. On account of the internal diameter D in the normal operating state being the same size at the seat of the spindle nut 51 as in the profile of the entire crash path, the absorption of energy takes place substantially by friction.

Figure 6:
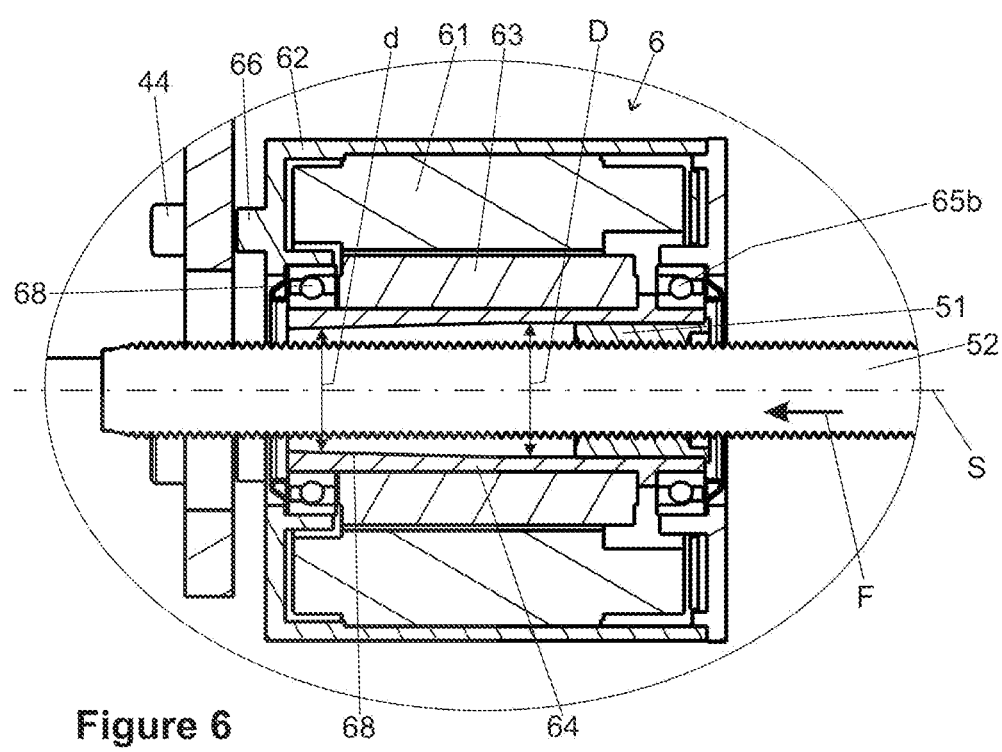
FIG. 6 is an enlarged sectional view of a second embodiment of an adjustment drive as in FIG. 4.

A refinement of the energy absorbing installation is shown in FIG. 6. The difference in comparison to the embodiment shown in FIG. 6 is that the internal diameter D in the normal operating state at the seat of the spindle nut 51 on account of inwardly projecting deformation elements 68 is constricted in the direction of the crash path, from right to left in FIGS. 4, 5, and 6. This can be implemented, for example, by a passage opening which conically tapers down to the deformation internal diameter d, the latter being smaller than the initial diameter D. The absorption of energy is influenced in various ways on account thereof. On the one hand, the friction when pressing the spindle nut 51 between the deformation elements 68 is increased such that the absorption of energy by friction increases. On the other hand, the energy absorbing elements 68 deform the spindle nut 51 such that additional deformation work is performed, the energy absorbing capability being additionally increased on account thereof.

Diverse energy absorbing characteristics can be flexibly implemented by measures which in terms of production technology can be implemented with little complexity, for example the design embodiment of the contact faces of the force-fit, the ratio of dimensions of the interference fit, the shaping of the energy absorbing elements 68, the material pairings between the rotor shaft 64 and the spindle nut 51, and combinations thereof. For example, the threaded spindle 52 and the rotor shaft 64 can be made from steel, and the spindle nut 51 can be made from plastics material or non-ferrous metal. The behavior in terms of friction and deformation when the spindle nut 51 passes through the rotor shaft 64 in the event of a crash can be influenced by the choice of the material pairing, and the energy absorbing characteristic can be predefined on account thereof.

The bearings 65a and 65b are of identical construction, specifically as angular-contact ball bearings which have in each case one bearing inner ring 651 that is fixedly attached to the rotor shaft 64, one bearing outer ring 652 that is fixedly inserted in the stator housing, and therebetween balls 653 which are disposed so as to be able to roll as rolling members. The bearings 65a and 65b are mutually preloaded in the direction of the spindle axis S. The extensions of the imaginary connecting lines between the bearing inner ring 651 and the bearing outer ring 652, through the ball contact faces (pressure points) of the two bearings 65a and 65b are schematically plotted with—lines and provided with the reference sign X. Said connecting lines intersect in the shape of an X on the spindle axis S in the region of the hollow shaft 64, between the bearings 65a and 65b, on account of which a so-called "X mounting" is implemented.

A second adjustment drive which, for example by way of the actuator lever 41, engages in the height direction H between the support unit 2 and the casing unit 4 and which is only schematically indicated is identified by the reference sign 7. The actuator drive 7 can be configured in a construction mode known from the prior art, as a plunger spindle drive or a rotating spindle drive, or so as to be configured according to the present invention, depending on the installation space available in the motor vehicle.

Figure 7:
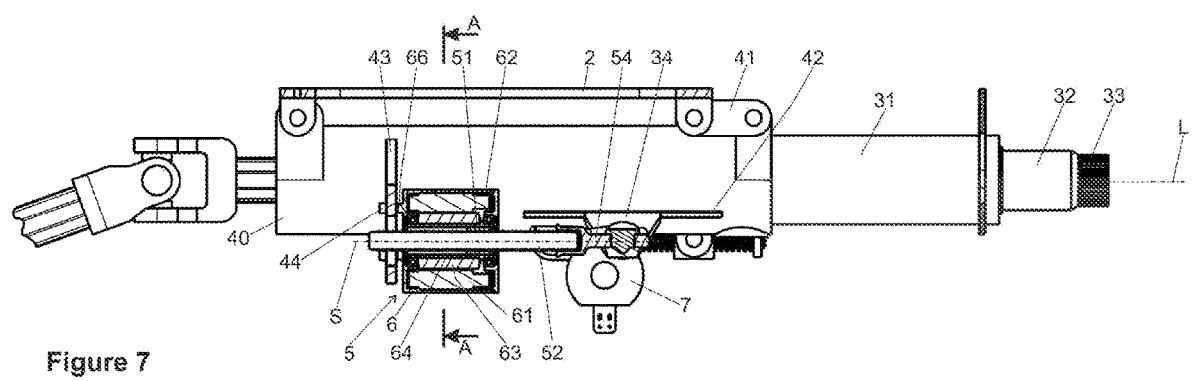
FIG. 7 is a longitudinal sectional view along the spindle axis of the adjustment drive in a third embodiment of a steering column.

A third embodiment is illustrated in FIGS. 7 to 9, wherein the steering column 1 of FIGS. 7 to 9 has a construction which is identical to that of the steering column from FIGS. 1 to 5, wherein the difference lies in the space-saving and compact configuration of the adjustment drive 5 which can be seen in the cross-sectional view of FIG. 8, which shows a section A-A from FIG. 7, as well as in the schematic perspective view of FIG. 8, the stator housing 62 having been omitted for improved clarity in the latter. A particularity of the illustrated drive motor 6 in comparison to the drive motor 6 illustrated in FIGS. 1 to 5 is the asymmetrically shaped stator 61 which on the circumference thereof that faces the casing unit 4, or the longitudinal axis L, respectively, has a radial concavity 67 which enables a relatively large stator diameter for a high motor torque to be predefined and to nevertheless keep the spacing between the spindle axis S and the longitudinal axis L relatively small so as to implement a compact construction mode. The concavity 67 is implemented in that the stator 6 in the cross-sectional profile has a recess in the shape of a segment of a circle. With the exception of the configuration of the stator 61, the further construction of the adjustment drive 5 is identical to that of FIGS. 1 to 5 such that a spindle drive having a threaded spindle 52 which engages in the spindle nut 51 which, so as to be able to be driven in a rotating manner about the spindle axis S relative to the threaded spindle 52, is coupled to the rotor shaft 64 of a drive motor 6 which has a rotor 63 and a stator 62, wherein the rotor shaft 64 of the drive motor 6 is configured according to the invention as a hollow shaft 64 which is disposed so as to be coaxial with the spindle axis S and in which the threaded spindle 51 is coaxially disposed. The drive motor 6 illustrated in FIGS. 7 to 9 can be operated in a particularly uniform manner, preferably by means of a pulse width modulated actuation system.

A drive motor 6 in a second embodiment is separately illustrated in FIG. 10 in a cross-sectional view as in FIG. 8, and in FIG. 11 in an exploded illustration exploded in the direction of the spindle axis S, wherein the actuator unit has been omitted for improved clarity. The individual parts having identical functions herein are provided with the same reference signs.

In a refinement of the first embodiment, the drive motor 6 has two radial concavities 67 which in terms of the spindle axis S are formed so as to be opposite in the circumference of the stator housing 62. As in the first embodiment, said concavities 67 in the cross-sectional profile form recesses in the shape of segments of a circle. The concavities 67 can in each case have the same cross section, as is illustrated, and be disposed so as to be symmetrical in terms of the spindle axis S. The quiet running can be improved on account thereof. Moreover, asymmetrical arrangements as well as, additionally or alternatively, different cross sections of the concavities 67, and/or additional concavities 67 are conceivable. The running properties can be adapted, or special installation situations can be taken into account on account thereof.

LIST OF REFERENCE SIGNS

1 Steering column
2 Support unit
21 Fastening means
22, 23 Pivot bearing
24 Pivot axis
3 Actuator unit
31 Internal casing/internal casing tube
32 Steering spindle
33 Fastening portion
34 Transmission element
35 Yoke
4 Casing unit
40 External casing/external casing tube
41 Actuator lever
42 Passage opening
43 Support console
44 Screws
5 Adjustment drive
51 Spindle nut
52 Threaded spindle
54 Fastening element
6 Drive motor
61 Stator
62 Stator housing
63 Rotor
64 Rotor shaft
65a,b Roller bearing
651 Bearing inner ring
652 Bearing outer ring
653 Ball
66 Fastening means
67 Concavity
68 Deformation element
7 Adjustment drive
L Longitudinal axis
H Height direction
S Spindle axis
V Adjustment
D, d Internal diameter

What is claimed is:

1. An adjustment drive for a motor-adjustable steering column for a motor vehicle, comprising:

a spindle drive, comprising:
- a drive motor having a rotor having a rotor shaft and a stator;
- a spindle nut coupled to the rotor shaft such that rotation of the rotor shaft drives the spindle nut in a rotating manner; and
- a threaded spindle having a spindle axis, the threaded spindle engaged with the spindle nut, wherein the rotor shaft of the drive motor is a hollow shaft disposed so as to be coaxial with the spindle axis and in which the threaded spindle is coaxially disposed,
wherein the spindle nut is made of a material that is softer than that of the hollow shaft.

2. The adjustment drive of claim 1 wherein the spindle nut is received in the hollow shaft.

3. The adjustment drive of claim 1 wherein the spindle nut has one or more of a force-fitting, a form-fitting or a substance-to-substance connection to the hollow shaft.

4. The adjustment drive of claim 3 wherein the connection is configured at least on a sub-portion of the external circumference of the spindle nut.

5. The adjustment drive of claim 3 wherein the connection is configured so as to be releasable by breaking when exceeding a predefined limit force which, in the direction of the spindle axis, acts on the spindle nut relative to the hollow shaft.

6. The adjustment drive of claim 1 wherein the drive motor has a motor housing in which the hollow shaft is mounted.

7. The adjustment drive of claim 1 wherein the drive motor is a servomotor.

8. An adjustment drive for a motor-adjustable steering column for a motor vehicle, comprising:
a spindle drive, comprising:
- a drive motor having a rotor having a rotor shaft and a stator;
- a spindle nut coupled to the rotor shaft such that rotation of the rotor shaft drives the spindle nut in a rotating manner; and
- a threaded spindle having a spindle axis, the threaded spindle engaged with the spindle nut, wherein the rotor shaft of the drive motor is a hollow shaft disposed so as to be coaxial with the spindle axis and in which the threaded spindle is coaxially disposed,
wherein an energy absorbing element is disposed between the spindle nut and the hollow shaft.

9. The adjustment drive of claim 8 wherein the energy absorbing element has one or both of a friction installation or a deformation installation interacting with the spindle nut and the hollow shaft.

10. The adjustment drive of claim 9 wherein the deformation installation has at least one deformation element which is disposed in a passage opening of the hollow shaft and by which the spindle nut in an axial movement relative to the hollow shaft is plastically deformable.

11. An adjustment drive for a motor-adjustable steering column for a motor vehicle, comprising:
a spindle drive, comprising:
- a drive motor having a rotor having a rotor shaft and a stator;
- a spindle nut coupled to the rotor shaft such that rotation of the rotor shaft drives the spindle nut in a rotating manner; and
- a threaded spindle having a spindle axis, the threaded spindle engaged with the spindle nut, wherein the rotor shaft of the drive motor is a hollow shaft disposed so as to be coaxial with the spindle axis and in which the threaded spindle is coaxially disposed,
wherein the drive motor has a motor housing in which the hollow shaft is mounted,
wherein the hollow shaft has at least two axially spaced-apart bearings.

12. A motor-adjustable steering column for a motor vehicle comprising an adjustment drive that comprises a spindle drive that includes a drive motor having a rotor having a rotor shaft and a stator, a spindle nut coupled to the rotor shaft such that rotation of the rotor shaft drives the spindle nut in a rotating manner, and a threaded spindle having a spindle axis, the threaded spindle engaged with the spindle nut, wherein the rotor shaft of the drive motor is a hollow shaft disposed so as to be coaxial with the spindle axis and in which the threaded spindle is coaxially disposed, the spindle drive of said adjustment drive being disposed between a support unit that is configured to connect to the bodywork and a casing unit that rotatably receives a steering spindle, and/or between casing tubes of a casing unit that are mutually adjustable in a telescopic axial manner and mount the steering spindle.

* * * * *